May 1, 1928.
J. W. LEGG
1,667,861
LOW PRESSURE INDICATOR
Filed Sept. 8, 1920
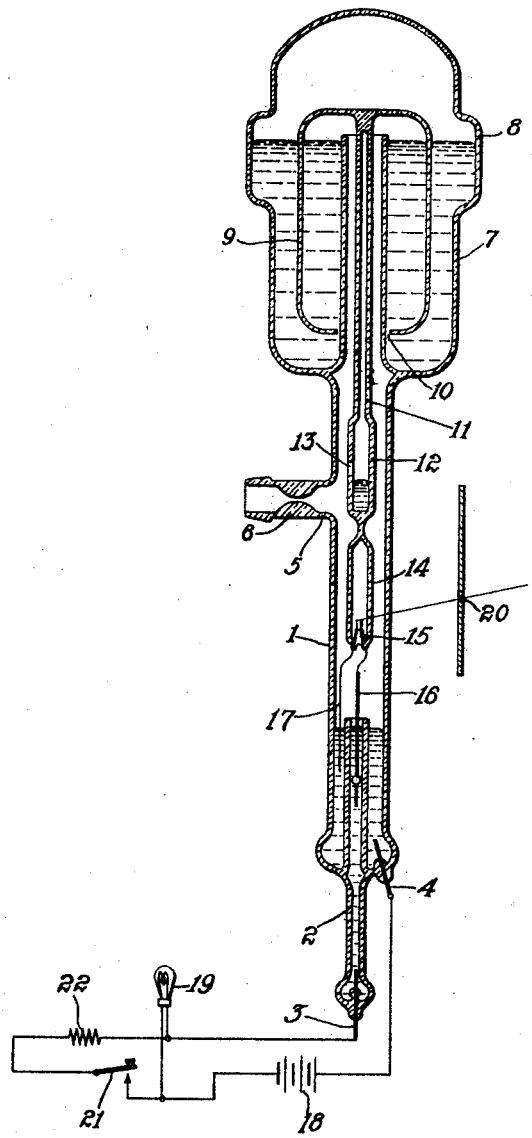
WITNESSES:
H. T. Shelhamer
H. C. Bierman
INVENTOR
Joseph W. Legg
BY
Wesley G. Carr
ATTORNEY Patented May 1, 1928.

1,667,861

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

LOW-PRESSURE INDICATOR.

Application filed September 8, 1920. Serial No. 408,953.

My invention relates to pressure gages and, more particularly, to pressure gages or indicators for use in connection with vacuum systems for indicating the degree of vacuum of such systems, and it has, for its primary object, the provision of a pressure gage which shall be extremely simple and economical in construction and, at the same time, unusually accurate and, therefore, efficient, in operation.

Heretofore, pressure gages have been constructed comprising float chambers containing mercury or an equivalent liquid in which floats were partly submerged, together with means governed by the relative pressures of the vacuum system being measured and a known vacuum, or atmospheric pressure, as the case might be, for causing vertical movement of the floats. In a gage of this character, the float carried an upwardly projecting element generally provided with indicating means cooperating with a scale in order that the desired readings might be obtained. Under such circumstances, it was necessary to provide guides, for the float and indicating means carried thereby, to maintain them in proper vertical position. The pressure indications were inaccurate because of the friction between such guides and movable float elements.

One of the objects of my present invention is to provide a gage in which the float chamber and float are located at the upper portion of the gage structure with the indicating means depending from the float so that all necessity for utilizing guides is obviated.

A still further object of my invention is to provide an indicating means for the gage of such character as to obtain a permanent record of the pressures measured, if desired.

Another object which I have in view is the provision of an alarm system, operating in conjunction with, and controlled by, the gage, so that, if the vacuum falls below a predetermined value, notice of its failure will be automatically given.

Pressure gages, as heretofore constructed, in which mercury has been employed as the actuating fluid, have also been open to the objection of being easily broken by shifting of the mercury during transportation or by mercury "hammering" occasioned by sudden changes in pressures, such as may be caused by a failure of the vacuum system.

Another object of my invention, therefore, resides in providing a gage structure of such character as to obviate, to a considerable extent, any likelihood of damage to the gage, either by sudden changes in pressures during use or by ordinary careful handling.

With these and other objects in view, my invention will be more fully described, illustrated in the single figure of the drawing, which is a central, vertical sectional view of a gage constructed in accordance with my invention, and then particularly pointed out in the claims.

My pressure gage or vacuum indicator, as shown in the drawing, comprises a tubular body 1 in the lower end of which a smaller tube 2 is sealed. The open upper end of the tube 2 projects a considerable distance into the body 1 and in its closed lower end is sealed a lead 3. The end of the body 1 in which the tube 2 is sealed is slightly enlarged and a second lead 4 sealed therein. A branch tube 5, having a restricted portion 6 to prevent mercury "hammering", as will be later apparent, leads from the body 1 at a suitable point and is adapted for connection to any vacuum system to be measured.

Sealed about the upper open end of the body 1 is a substantially cylindrical float chamber 7 which, near its upper closed end, is circumferentially enlarged, as indicated at 8, and the open end of the body 1 preferably projects into this enlarged portion of the float chamber.

Positioned in the float chamber and surrounding the upper end of the body 1 is a hollow, substantially cylindrical float 9, which is closed at its upper end and is formed, in its lower end, with a central opening 10 somewhat greater in diameter than the external diameter of the body 1.

A stem 11, preferably formed integrally with, and depending from, the top of the float, projects downwardly into the body 1 of the gage to a point somewhat above the open upper end of the tube 2. This stem may be in the form of a rod but is preferably a tube sealed at its upper end and provided, at a point near the branch tube 5, with a small chamber 12 having, in its side wall, an opening 13 through which mercury or other adjustable weighting material may be introduced. Below the chamber 12, the tubular stem is sealed off to provide a bulb 14 in which is disposed the filament of a pea-lamp 15 from the terminals of which project leads or conductors 16 and 17, one of which extends into the open end of the tube 2 and the other of which extends into the annular space between such tube and the lower sealed end of the body 1.

The lower end of the body 1 and the tube 2 are filled with mercury to a level slightly below the upper open end of the tube 2, as clearly shown in the drawing, and the float chamber 7 is filled with mercury to a point somewhat below the upper open end of the body 1, a high vacuum being created in the float chamber above the mercury so that the mercury surrounding the float is subjected to an extremely slight pressure while the mercury within the float is subjected to whatever pressure there may be in the body of the pressure gage or, in other words, to whatever pressure there may be in the system with which the gage is employed.

The weight of the entire moving element, comprising the float, its stem and the parts carried thereby, including the stabilizing weight of mercury or other material, is just balanced by the weight of mercury displaced by the sides of the float chamber, together with what pressure may be exerted upon the top of the float by the small amount of air or gas contained in the float chamber above the mercury level. The volume of the chamber within the float is made greater than the possible volume of the float chamber above the level of mercury therein, to insure a proper level of mercury in both the float and float chamber for all possible positions of the float.

It will be obvious that, if the diameter of the float is relatively large and its walls are thin, it will rise considerably upon a very slight increase in pressure in the space within the float between the top of the float and the mercury therein which space is, at all times, in communication with the system being measured. The ratio of the deflection or vertical movement of the float and its stem to the changes in levels of the mercury within the float and float chamber is $$R = \frac{1/4 \pi (d_o - 2t)^2}{\pi (d_o - t) t}$$

or approximately $$R = \frac{d}{4t}$$

where $t$ equals the thickness of the glass of the float, and $d_o$ equals its outside diameter and $d$ is the diameter of the float, considering its walls of negligible or zero thickness. It should, therefore, be noted that calibration of the gage is a straight-line function and may readily be made.

Readings may be taken by means of a scale (not shown) disposed adjacent the body 1 but I prefer to provide means for rendering the readings more accurate by magnifying them through the employment of an optical lever operating in conjunction with the pea-lamp 15. For this purpose, the leads 3 and 4 may be connected in series with a battery 18 and an electrically actuated signal device 19 which may comprise a lamp. Under such circumstances, the pea-lamp 15 will normally be energized and its light rays may be passed through a small opening in a screen 20 and directed upon a relatively remote large scale (not shown) in order that readings of the gage deflections may be readily and accurately made.

Obviously, if the pressure in the system being measured becomes too high, as by failure of the vacuum system, the float and its stem will rise to such an extent as to lift the lower end of the conductor or lead 17 from the mercury in the lower portion of the gage body to open the circuit through the pea-lamp and also through the signal device 19. By this means, I provide an automatic alarm which will indicate any failure of the vacuum system in conjunction with which the gage is being employed.

As a means for intensifying the light given off by the pea-lamp, at the times when readings are to be made, I may connect a manually-operable switch 21 and a suitable resistance 22 in a shunt circuit about the signal device 19. Under such circumstances, it will be clear that, when the key or switch 21 is closed, the greater part of the current will be shunted from the signal device 19 and, as a consequence, a stronger current will pass through the pea-light 15.

The above described pressure gage is, therefore, capable of indicating, with great accuracy, the pressures in a vacuum system with which it is employed and of giving an alarm when the pressure rises above a predetermined point in the system. Obviously, by directing the light from the pea-lamp which passes through the screen 20 upon a time-mechanism-actuated sensitized film, in the manner practiced in connection with mirror galvanometers, a permanent record of the measurements made by the gage may be obtained.

By reason of the fact that, in measuring the pressure in a system, I do not increase or decrease the pressure of the gas therein, I am enabled to measure the pressure of an imperfect or condensable gas or vapor as accurately as that of a perfect gas.

From the foregoing description, it will be obvious that I have provided a gage which is simple in construction and which is not so delicate as to be likely to be damaged by ordinary careful handling. Furthermore, by reducing the passage through the tube communicating between the gage and the system being measured, mercury "hammering", which might be occasioned by sudden failure of vacuum in the system, is prevented and all likelihood of breaking the gage through sudden shifting of the contained mercury is, therefore, obviated. By providing the enlarged portion 8, I prevent the surface tension of the mercury from causing the float 9 to be shifted out of its proper position.

Although I have illustrated and described my invention in considerable detail, it will be apparent that various minor changes in construction and arrangement of parts may be resorted to without departing from the general principles of the invention and I, therefore, reserve the right to make any alterations which may come within the scope of the claims.

I claim as my invention:—

1. In a fluid-pressure indicator, the combination with an enclosing vessel having a liquid therein and means for connecting the same to a source of fluid pressure to be measured, of a source of light, and means for controlling light rays from said light source in response to pressure changes comprising a float structure embodying a portion of inverted substantially cup-shape partly immersed in the liquid and means providing communication between the interior of said cup and said fluid-pressure source through said connecting means.

2. In a fluid-pressure indicator, the combination with an enclosing vessel having a liquid therein and means for connecting the same to a source of fluid pressure to be measured, of a source of light, and means constituting an optical lever for controlling light rays from said light source in response to pressure changes comprising a float structure embodying a portion of inverted substantially cup-shape partly immersed in the liquid and means providing communication between the interior of said cup and said fluid pressure source through said connecting means.

3. A fluid-pressure indicator comprising an enclosing liquid-containing vessel having means for connecting the same to a source of fluid pressure, an enlarged chamber portion and communicating aligned tubular portions integral therewith extending oppositely from the bottom wall thereof, a float structure including a member of inverted substantially cup-shape and of relatively large diameter compared to said tubular portions and surrounding the inner tubular portion in freely-movable relation thereto, said float member having a hollow stem depending from its upper end into said tubular portion in freely movable relation thereto and communicating with said fluid-pressure source and means for preventing sudden movement of the communicating fluid.

4. A fluid-pressure indicator comprising an upper enclosing liquid-containing vessel, communicating aligned tubes sealed to, and extending oppositely from, the bottom of the vessel, and a float including a member of inverted substantially cup-shape surrounding the upper of said tubes, a stem depending from the closed end of the cup and through said upper tube into the lower tube and a weight-receiving portion on said stem in the lower tube, said tubes being entirely closed except for a pressure-inlet opening in the lower tube and a pressure-outlet opening in the upper tube to admit pressure through the tubes to the interior of said cup.

5. A fluid-pressure indicator comprising an upper enclosing liquid-containing vessel, communicating aligned tubes sealed to, and extending oppositely from, the bottom of the vessel, and a float including a member of inverted substantially cup-shape surrounding the upper of said tubes, said cup being of relatively large diameter compared to the diameter of said upper tube and having an inturned lower edge extending close to the tube, a stem depending from the closed end of the cup and through said upper tube into the lower tube, said tubes being entirely closed except for a pressure-inlet opening in the lower tube and a pressure-outlet opening in the upper tube to admit pressure through the tubes to the interior of said cup.

6. A fluid-pressure indicator comprising an upper enclosing liquid-containing vessel, communicating aligned tubes sealed to, and extending oppositely from, the bottom of the vessel, and a float including a member of inverted substantially cup-shape surrounding the upper of said tubes and having a stem depending from the closed end of said cup and through said upper tube into said lower tube, said tubes being entirely closed except for a pressure-inlet opening in the lower tube and an outlet opening in the upper tube to admit pressure through the tubes to the interior of said cup.

7. A fluid-pressure indicator comprising an upper enclosing liquid-containing vessel, communicating aligned tubes sealed to, and extending oppositely from, the bottom of the vessel, a pressure-inlet tube having a constricted bore and connected to said lower tube, said upper tube extending to a position slightly above the liquid level in the vessel and said lower tube being closed except for said inlet tube, and a float including a member of inverted substantially cup-shape surrounding said upper tube and an indicating stem depending from the closed end of the cup and through said upper tube into said lower tube.

8. A fluid-pressure indicator comprising an upper enclosing liquid-containing vessel having a laterally-extended portion opposite the normal liquid level to provide a liquid-surface area greater than parallel cross-sectional areas of the liquid below the surface thereof, a tube sealed to the bottom of the vessel and extending above the liquid surface, and a float including a member of inverted substantially cup-shape surrounding the upper end of said tube and a stem depending from the closed end of the cup through said tube, the lower portion of said cup projecting below said laterally-extended portion of the vessel.

9. A fluid-pressure indicator comprising an upper enclosing liquid-containing vessel, communicating aligned tubes sealed to, and extending oppositely from, the bottom of the vessel, a pressure-inlet tube having a constricted bore and connected to the lower of said tubes, a tertiary tube extending upwardly from, and sealed to, the bottom of the lower of said tubes, a body of conducting liquid in the tertiary tube and a similar body in said lower tube around the tertiary tube, both bodies being below the upper end of the tertiary tube, terminals for connecting said liquid bodies to an exterior circuit, and a float structure including a member of inverted substantially cup-shape of large diameter compared to said tubes surrounding the upper of said tubes, a stem depending from the closed end of said cup carrying, in said lower tube, an electrical indicating device, and leads cooperating between said indicating device and said conducting-liquid bodies.

10. A fluid-pressure indicator comprising an upper enclosing liquid-containing vessel having a laterally-extended upper portion, communicating aligned primary tubes sealed to, and extending oppositely from, the bottom of the vessel, the upper end of the upper primary tube being disposed above the liquid level laterally opposite said laterally-extended portion, a pressure-inlet tube having a constricted bore and connected to the lower primary tube, communicating aligned secondary tubes sealed to, and extending oppositely from, the bottom of said lower primary tube, a body of conducting liquid in the secondary tubes and a similar body in the lower primary tube, both bodies being below the upper end of the upper secondary tube, circuit terminals for said liquid bodies extending through, and sealed to, the bottoms of the lower primary and secondary tubes and a float including a member of inverted substantially cup-shape of large diameter compared to the primary tubes surrounding the upper primary tube and having an annular bottom flange extending inwardly close to, but free of, the upper primary tube, a stem depending from the top of said float having, in the lower primary tube, a weight-receiving portion and a portion constituting a lamp bulb, a filament in the bulb, and leads for the filament sealed through the bulb for cooperation with said conducting liquid bodies.

In testimony whereof, I have hereunto subscribed my name this 1st day of September 1920.

JOSEPH W. LEGG.